United States Patent [19]

Kiuchi

[11] Patent Number: 5,058,076
[45] Date of Patent: Oct. 15, 1991

[54] ADDRESS CONTROL CIRCUIT FOR DATA MEMORY EMPLOYED IN SIGNAL DELAY CIRCUIT

[75] Inventor: Toyoo Kiuchi, Tokyo, Japan
[73] Assignee: NEC Corporation, Tokyo, Japan
[21] Appl. No.: 424,557
[22] Filed: Oct. 20, 1989

[30] Foreign Application Priority Data

Oct. 20, 1988 [JP] Japan .................................. 63-265399

[51] Int. Cl.⁵ .......................... G11C 8/00; G11C 7/00
[52] U.S. Cl. ................................ 365/230.01; 365/194; 365/230.08
[58] Field of Search ....................... 365/230.01, 230.08, 365/194, 45, 189.08; 364/200 MS File, 900 MS File; 360/32

[56] References Cited

U.S. PATENT DOCUMENTS

| | | | |
|---|---|---|---|
| 4,348,754 | 9/1982 | Haynes et al. .................. | 365/194 X |
| 4,549,283 | 12/1985 | McDermott, III ................. | 365/194 |
| 4,630,301 | 12/1986 | Hohl et al. ............................. | 365/45 |
| 4,663,741 | 5/1987 | Reinschmidt et al. ..... | 365/230.08 X |
| 4,730,272 | 3/1988 | Sullivan ................................ | 365/45 |
| 4,740,923 | 4/1988 | Kaneko et al. ....................... | 365/194 |

Primary Examiner—Alyssa H. Bowler
Attorney, Agent, or Firm—Foley & Lardner

[57] ABSTRACT

An address control circuit for a data memory includes a first register for temporarily storing address information applied thereto and for supplying the stored address information to the data memory, a second register for temporarily storing write address information, a third register for temporarily storing offset address information, a write address control circuit coupled to the first and second registers for supplying to the first register address information relative to the write address information and for updating the content of the second register in a data write operation, and a read address control circuit coupled to the first to third registers for producing read address information corresponding to a difference between the content of the second register and the offset address information and for supplying the read address information to the first register in a data read operation.

7 Claims, 5 Drawing Sheets

| Address | Data | |
|---|---|---|
| "0000H" | "036FH" | 30 |
| | ⋮ | |
| "7801H" | "0372H" | |
| | ⋮ | |
| "7D28H" | "030AH" | |
| | ⋮ | |
| "7EE1H" | "0375H" | |
| "7FD1H" | "0367H" | |
| | ⋮ | |
| "8098H" | "03B6H" | |
| "8099H" | "03BFH" | |
| "809AH" | | |
| | ⋮ | |
| "FFFFH" | | |

FIG. 2

ADDRESS CONTROL CIRCUIT FOR DATA MEMORY EMPLOYED IN SIGNAL DELAY CIRCUIT

BACKGROUND OF THE INVENTION

The present invention relates to a signal delay circuit utilizing a data memory and, more particularly, to an address control circuit employed in such a signal delay circuit for generating a data write address and a data read address for the data memory.

In recent audio systems, "Acoustic Environment Reproduction" is becoming one of main themes for audio application. Acoustic Environment Reproduction is a process to provide a pseudo acoustic effect for realizing a concert hall's acoustic effect, for example. In order to realize the concert hall's acoustic effect, the reproduction of reverberation sound is required. For this purpose, a signal delay circuit utilizing a data memory is used.

More specifically, an audio signal to be reproduced is converted into and outputted as digital data in a sampling cycle from a compact disk player, for example. The respective digital data are then temporarily written into the data memory by supplying respective data write addresses to the memory. Certain digital data, which has already been written into the data memory, is read out therefrom after a preselected time period by supplying the corresponding data read address to the memory. The read-out digital data is then subjected to a desired type of processing such as a digital filter processing. The reverberation sound data is thereby reproduced. That preselected time period corresponds to a delay time of the reverberation sound. If a plurality of reverberation sound data are necessary at one time, the corresponding digital data, which have already been written into the data memory at different sampling times, are read out therefrom within one sampling cycle.

Thus, as addresses to be supplied to the data memory in each sampling cycle, there are required a data write address for current audio digital data and at least one read data address for reverberation sound data. Each of the data write and read addresses is, in general, calculated and then supplied to the data memory by a program consisting of a string of instructions. On the other hand, in order to realize acoustic environment reproduction, other processes such as a noise reduction, tone control, loudness compensation, stereo image enhancement, etc., are also required in each sampling cycle. These processes are performed by a great number of appropriate digital filtering operations which are in turn controlled by a program. This means that the number of program steps available for controlling the filtering operations is reduced due to the program for calculating and generating the data write and read addresses. For this reason, the realization of the acoustic environment reproduction results in incomplete results.

SUMMARY OF THE INVENTION

Therefore, an object of the present invention is to provide an address control circuit for a signal delay circuit utilizing a data memory.

Another object of the present invention is to provide an address control circuit for generating both data write and read addresses without requiring a number of instructions.

Still another object of the present invention is to provide an improved data delay circuit employed in a reverberation sound reproduction apparatus.

An address control circuit according to the present invention comprises a first latch circuit for temporarily storing address information applied thereto and supplying the stored address information to a data memory, a second latch circuit for temporarily storing write address information, a write address control circuit coupled to the first and second latch circuits for applying address information relative to the write address information to the first latch circuit and for renewing the content of the second latch circuit in response to each of the data write operations, a third latch circuit for temporarily storing offset address information, and a read address control circuit coupled to the first to third latch circuits for producing a difference between the content of the second latch circuit and the offset address information and for applying the difference to the first latch circuit as read address information in response to each of the data read operations.

Thus, the renewal of the write address information and the calculation of the read address information are performed without a software program. Moreover, the read address information, i.e. a data delay time, can be controlled arbitrarily by changing the offset address information to be stored in the third latch circuit. It is convenient to provide a plurality of third latch circuits each storing offset address information different from each other. A plurality of types of read address information can be thereby generated in one sampling cycle.

BRIEF DESCRIPTION OF THE DRAWINGS

The above and other objects, advantages and features of the present invention will become more apparent from the following description taken in conjunction with the accompanying drawings, in which:

FIG. 2 is a data map of a data memory shown in FIG. 1;

DETAILED DESCRIPTION OF THE EMBODIMENTS

Figure 1:
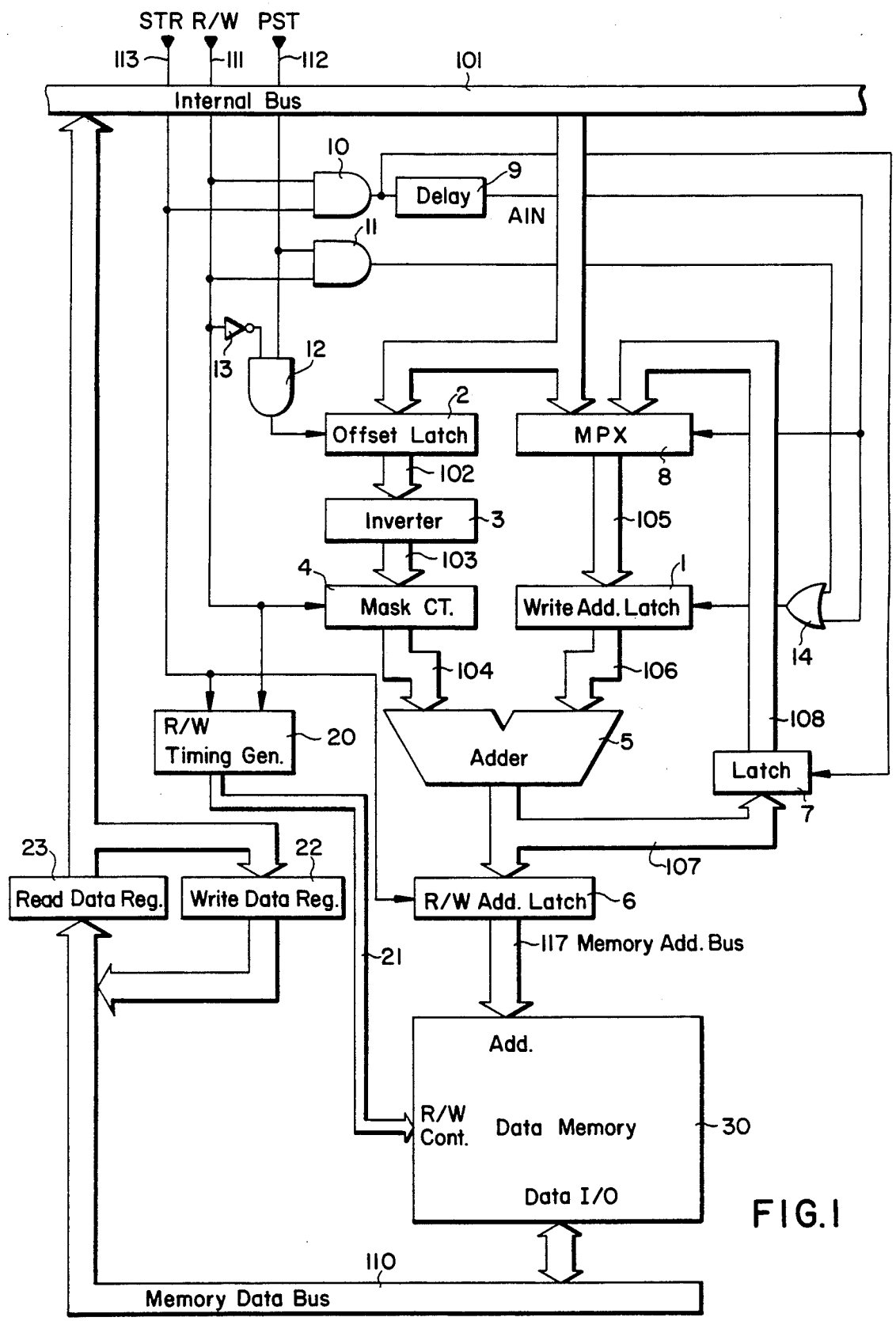
FIG. 1 is a circuit diagram representative of an embodiment of the present invention.

Referring to FIG. 1, an address control circuit according to an embodiment of the present invention includes four latch circuits 1, 2, 6 and 7, an inverter circuit 3, a mask circuit 4, an adder 5, a multiplexer (MPX) 8, a delay circuit 9, three AND gates 10 to 12, an OR gate 14 and an inverter 13. Each of the latch circuits is of 16-bit construction. The latch circuit 1 temporarily stores write address information and the latch circuit 2 temporarily stores as offset address information a difference between write and read addresses corresponding to a delay time of reverberation sound data. The multiplexer 8 selects the address supplied from an internal bus 101 and supplies it to the latch circuit 1 when the output of the delay circuit 9 assumes a low level. On the other hand, in the case when the output of the delay circuit 9 takes the high level, the multiplexer 8 selects the output of the latch circuit supplied from a 16-bit bus 108 and supplies it to the latch circuit 1. The offset latch circuit 2 is presettable with the offset address information supplied from the internal bus 101 in response to the high level output of the AND gate 12. The output of the latch circuit 12 is transferred via a 16-bit bus 102 to the inverter circuit 3, so that the inverted offset address information appears on a bus 103 and then is supplied to the mask circuit 4. The mask operation of the mask circuit 4 is controlled by a read/write control signal R/W designating a data read or data write operation. When the signal R/W takes the high level to designate the data write operation, the masks circuit 4 mask the information on the bus 103 and produces 16-bit information of all "0". In the case when the signal R/W takes the low level to designate the data read operation, the mask circuit 4 transfers the information on the bus 103 onto a bus 104 as it is. The adder 5 performs an addition operation on the two items address data from the latch circuit 1 and the mask circuit 4 and further increments that addition resultant by one. That is, the adder 5 updates the write address information from the latch circuit 1 by one in the data write operation and outputs read address information which is the write address information minus the offset address information. The incrementing operation of the adder 5 can be performed by a carry signal to the least significant bit of the adder 5. The output from the adder 5 is supplied to both of the latch circuits 6 and 7. The latch circuit 6 latches the address information applied thereto in response to a start signal STR and supplies the latched address information to a data memory 30 via a memory address bus 117. The latch circuit 7 latches the address information applied thereto in response to the high level output from the AND gate 10. The start signal STR initiates the data write and read operations and the pulse width thereof is designed to be 100 nsec in this embodiment. The signals STR and R/W are supplied to the AND gate 10 whose output is in turn supplied to the latch circuit 7 and the delay circuit 9. The delay circuit 9 can be constituted by a plurality of inverters connected in series and it delays the high level output of the AND gate by a time period of 200 nsec. The signal R/W is further applied to one input node of the AND gate 11 and via the inverter 13 to one input node of the AND gate 12. The other input nodes of the AND gates 11 and 12 are supplied with a preset signal PST. The outputs of the AND gate 11 and the delay circuit 9 are supplied to the OR gate 14 whose output is in turn supplied to the latch circuit 1. The signals STR and R/W are further supplied to a read/write timing generator 20 which in turn supplies the data memory 30 with read/write timing signals 21 such as an address latch signal, and a data read/write designation signal. The preset signal PST is used for presetting write address information into the latch circuit 1 and offset address information into the latch circuit 2. More specifically, when the signal PST is changed to the high level during the high level period of the signal R/W, the AND gate 11 produces a high level which is in turn supplied to the latch circuit 1 via the OR gate 14. At this time, the signal STR assumes the low level, i.e. the output of the delay circuit 9 takes the low level, so that the multiplexer 8 selects and couples the internal bus 101 to the latch circuit 1. As a result, the data on the bus 101 is latched in the circuit 1 as write address information. On the other hand, in the case where the signal PST is changed to the high level during the low level period of a signal R/W, the AND gate 12 produces the high level. Accordingly, the latch circuit 2 latches the data on the bus 101 as offset address information.

Digital audio data to be written into the data memory 30, which is supplied from the internal bus 101, is temporarily stored in a write data register 22 and then transferred via a memory data bus 110 to the data memory 30. The data read out of the memory 30 is temporarily stored in a read data register 23 and then transferred to the internal bus 101. The data memory 30 is of 16-bit×64K-word construction.

Next, an operation will be described in the case when the address control circuit shown in FIG. 1 is employed in a reverberation sound reproduction apparatus whose music source is a compact disk player, with reference to FIGS. 1 to 3. In the compact disk player, the digital audio data recorded on a compact disk are read out therefrom from as 16-bit data in a sampling cycle $f_{sc}$ of 22.7$\mu$ sec per one of the left and right channels. Therefore, the respective digital audio data are temporarily written into the data memory 30 in the sampling cycle $f_{sc}$. In the present description, it is assumed that four data, which have already written into the data memory 30, are read out therefrom in one sampling cycle $f_{sc}$ to produce four reverberation sound data having delay times of about 50 msec, 20 msec, 10 msec and 5 msec, respectively. Therefore, the address control circuit shown in FIG. 1 is required to produce four items of read address information in one sampling cycle $f_{sc}$. Since the sampling cycle $f_{sc}$ is 22.7$\mu$ sec, four items of offset address information, corresponding to 50 msec, 20 msec, 10 msec and 5 msec representing differences from the current write address information, are "0898H", "0371H", "01B8H" and "00C8H", respectively. The mark "H" denotes a hexadecimal notation.

Figure 3:
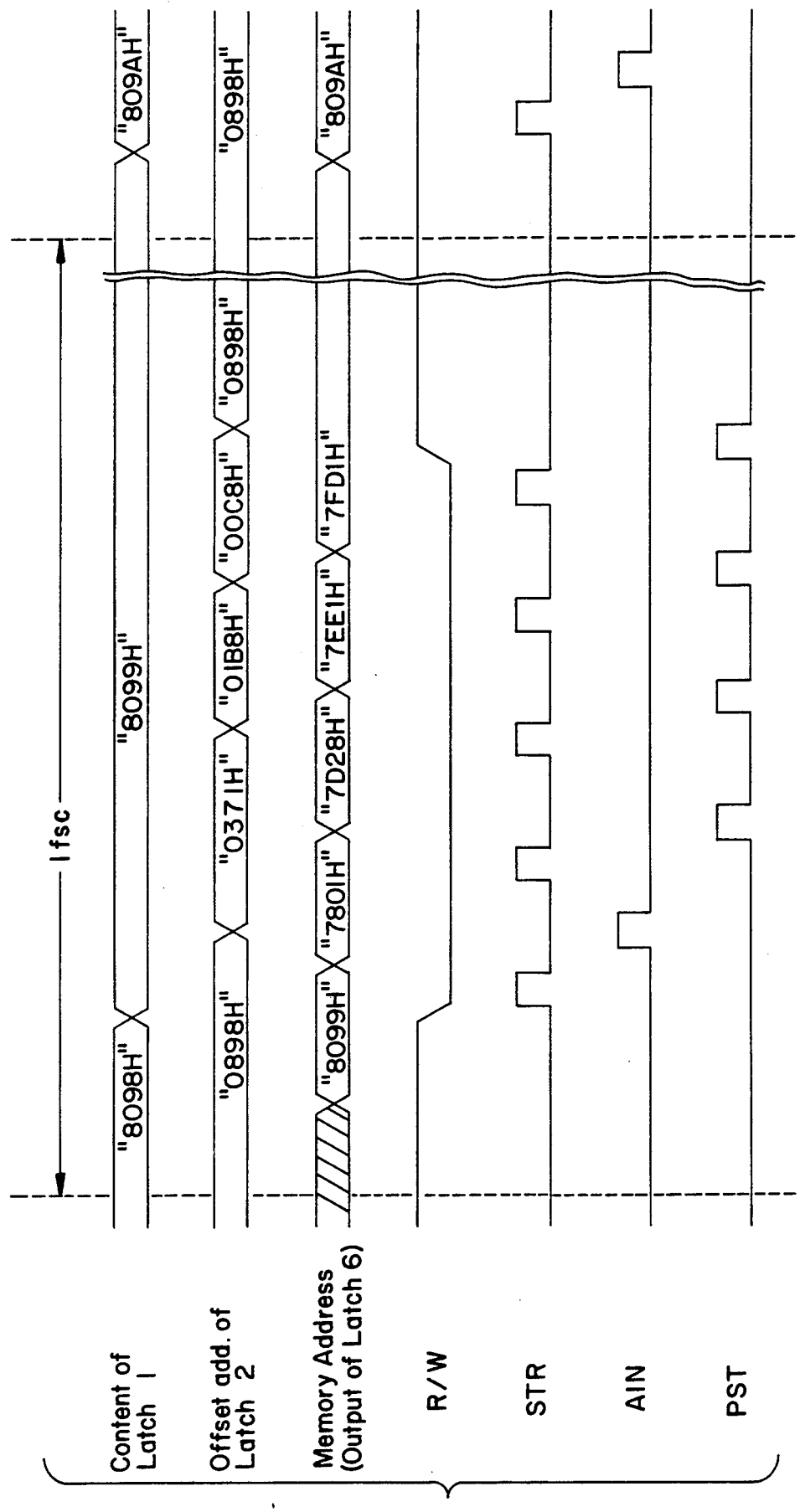
FIG. 3 is a timing chart representative of an address generating operation according to the circuit shown in FIG. 1.

When the digital audio data in the current sampling cycle is temporarily stored in the write data register 22 via the internal bus 101, a sequence controller (not shown) generates first the start pulse signal STR while holding the read/write signal R/W at the high level, as shown in FIG. 3. At this time, the write address information in the previous sampling cycle, "8098H" for example, has already been stored in the latch circuit 1. Since the signal R/W is at the high level, the output of the mask circuit 4 is all "0", so that the adder 5 outputs the renewed write address information, "8099H". In response to the start signal STR, the latch circuit 6 latches and supplies the renewed write address information of "8099H" to the data memory 30. The timing generator 20 responds to the signals STR and R/W and supplies data write control timing signals 21 to the data memory 30. As a result, the digital audio data stored in the register 22 is transferred to the data memory 30 and then written into the address location "8099H" thereof, as shown in FIG. 2. In response to the signal STR, the AND gate 10 produces the high level, so that a renewed write address information "8099H" is also latched in the latch circuit 7. Since the pulse width of the signal STR is designed to be 100 nsec and the delay time of the delay circuit 9 is designed to be 200 sec, the output AIN from the delay circuit is changed to the high level after the signal STR is returned to the low level. In response to the high level output AIN, the multiplexer 8 selects the output of the latch circuit 7 and the latch circuit 1 latches the renewed write address information "8099H". The content of the latch circuit 6 is not changed at this time.

The address control circuit is thereafter brought into a data read operation mode by the signal R/W being changed to the low level. At this time, the offset latch circuit 2 has been preset with the offset address information of "0898H". In response to the low level of the signal R/W, the inverter 3 and the mask circuit 4 supply the adder 5 with the inverted data of the offset address information "0898H". The adder 5 thus performs the operation of ("8099H"−"0898H") and supplies the resultant data, "7801H", to the latch circuit 6. In this state, the start pulse signal STR is produced again, so that the latch circuit 6 latches and supplies the data "7801H" to the data memory 30 as read address information. The timing generator 20 responds to the signal STR and the low level signal R/W and supplies read data control timing signals 21 to the data memory. The address location "7801H" of the data memory 30 shown in FIG. 2 is accessed and the data is read out therefrom and then transferred to the read data register 23. The data in the register 23 is thereafter transferred onto the internal bus 101. Thus, the digital audio data, which have been written about 50 msec (=22.7μ sec×"0898H") ago in the memory 30, is read out therefrom in the current sampling cycle. Since the signal R/W is at the low level, the contents of the latch circuits 1 and 7 do not change. In order to preset the second offset address information "0371H" in the latch circuit 2, the preset signal PST is applied when transferring the second offset information onto the bus 101. Therefore, the latch circuit 2 latches the second offset address information "0371H" and the adder 5 outputs the resultant data, "7D28H", of ("8098H"−"0371H"). The start signal STR is produced again, so that the latch circuit 6 supplies the data memory 30 with the second read address information "7D28H". The data stored in the address location "7D28H" is thereby read out therefrom and then transferred onto the bus 101 via the memory data bus 110 and the register 23. Thus, the digital audio data, which has been written about 20 msec (=22.7μ sec×"0371") ago in the memory 30, is also read out therefrom in the current sampling cycle. By repeating the above offset address information presetting operation and the production of the start signal STR, the digital audio data, which have been written 10 msec and 5 msec ago into the memory 30, are also read out therefrom in the current sampling cycle, respectively. These four read-out digital audio data are thereafter subjected to appropriate digital filtering procedures to produce four reverberation sound data. When the current sampling cycle is completed, the above operations are executed again in the next sampling cycle.

Figure 4:
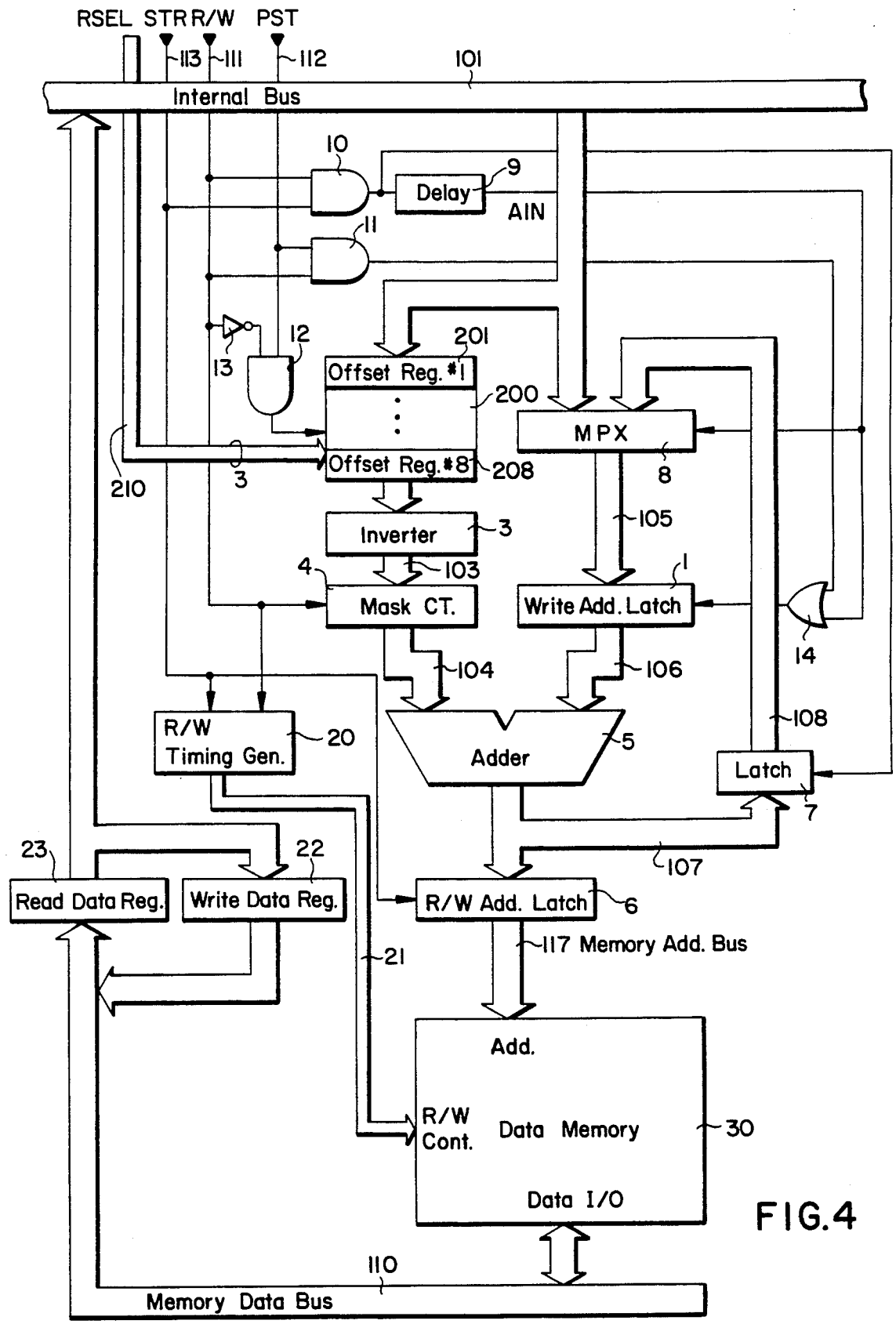
FIG. 4 is a circuit diagram representative of another embodiment of the present invention.

Referring to FIG. 4, there is shown another embodiment of the present invention, wherein the same constituents as those shown in FIG. 1 are denoted by the same reference numerals to omit further description thereof. In this embodiment, the offset latch circuit 2 shown in FIG. 1 is replaced by a register file 200 including eight registers 201 to 208 (only two registers 201 and 208 being shown in the drawing), in order to store the offset address information presetting operations in each sampling cycle. One of the registers 201 to 208 is selected by register selection data RSEL of 3-bits supplied from a bus 210. Therefore, eight kinds of offset address information are presettable in the file 200 in an initial state.

Figure 5:
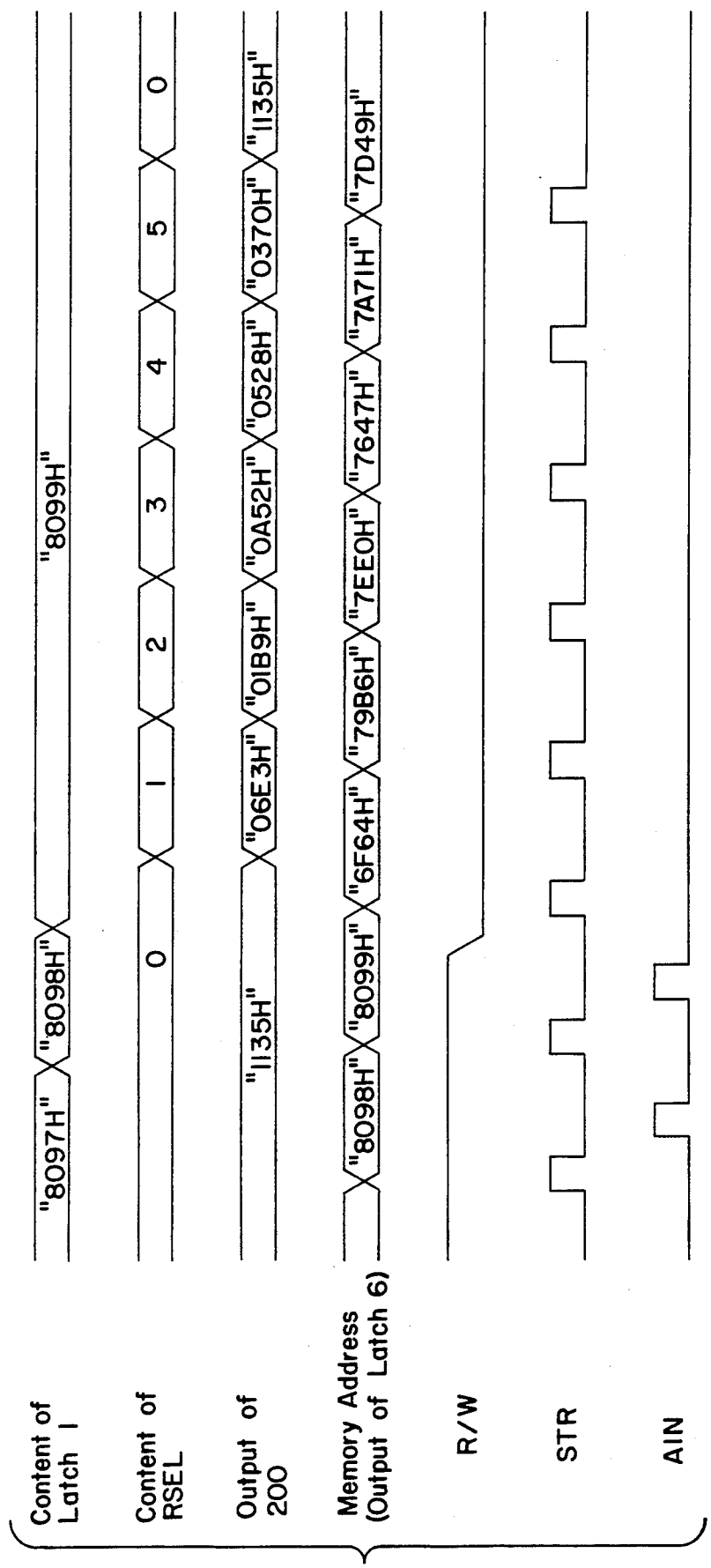
FIG. 5 is a timing chart representative of an address generating operation according to the circuit shown in FIG. 4.

The operation will be described below with reference to FIGS. 4 and 5. In the present description, since the left channel and right channel digital audio data are outputted from the compact disk player in the sampling cycle $f_{sc}$, these two channel data are temporarily written into the successive address locations of the data memory 30 in one sampling cycle. Further, it is assumed that three digital data, which have been written into the memory 30, are read out therefrom in one sampling cycle to produce three reverberation sound data with respect to each of the left and right channels. It is further assumed that three reverberation sounds of the left channel have delay times of about 50 msec, 20 msec and 5 msec and those of the right channel have delay times of about 30 msec, 15 msec and 10 msec, respectively. Therefore, the offset registers 201, 202 and 203 are preset with the offset information of "1135H", "06E3H" and "01B9H" and the offset registers 204, 205 and 206 are preset with the offset information of "0A52H", "0528H" and "0370H", respectively.

When the left channel digital data in a certain sampling cycle is stored in the register 22 via the bus 101, the start signal STR is generated when holding the signal R/W at the high level. At this time, the latch circuit 1 stores the write address information in the previous sampling cycle, "8097H" for example. Therefore, the renewed write address information "8098H" is supplied to the data memory 30 via the latch circuit 6, so that the left channel digital data is written into the address location "8098H" of the memory 30. The content of the latched circuit 1 is thereafter renewed to "8098H". The start signal STR is produced again with holding the signal R/W at the low level. As a result, the right channel data in this sampling cycle is written into the address location "8099H" of the data memory 30 via the register 32 and bus 110. The content of the latch circuit is thereafter renewed to "809AH".

The address control circuit is turned to a data read operation by the signal R/W changing to the low level. At this time, the register selection data RSEL takes a "0", so that the register 201 is selected and the inverted data of the offset address "1135H" is supplied to the adder 5. Therefore, the adder 5 outputs read address information "6F64H" (="8099H"−"1135H"). The start pulse signal STR is then generated, so that the address location "6F64H" of the memory 30 is accessed. Thus, the left channel audio data, which has been written about 50 msec ago into the memory 30, is read out therefrom. The content of the register selection data RSEL is thereafter changed to a "1" to select the second offset register 202. The content of the register 202, "01B9H", is thereby read out and the inverted data thereof is supplied to the adder 5. By the generation of the signal STR, second read address information "79B6H" (="8099H"−"01B9H") is supplied to the memory. As a result, the right channel audio data, which has been written about 30 msec ago into the memory 30, is read out therefrom. The above data read operation is continued. As a result, three reverberation sound data with respect to each of the left and right channels can be reproduced.

The present invention is not limited to the above embodiments, but may be modified and changed without departing from the scope and spirit of the invention.

What is claimed is:

1. An address control circuit, comprising:
   first storage means for temporarily storing address information applied thereto and supplying said address information to a data memory;
   second storage means for temporarily storing write address information;

first control means coupled to said first and second storage means for applying address information relative to said write address information stored in said second storage means to said first storage means in response to a data write operation;

third storage means for temporarily storing offset address information; and second control means coupled to said first, second and third storage means for producing read address information corresponding to a difference between said write address information stored in said second storage means and said offset address information stored in said third storage means and for applying said read address information to said first storage means in response to a data read operation;

wherein said third storage means includes a plurality of storage locations each of said storage locations storing offset address information and means responsive to selection data for selecting one of said storage locations and for supplying said offset address information stored in said one of said selected storage locations to said second control means.

2. An address control circuit for supplying a data memory with write address information in a data write operation and with read address information in a data read operation, comprising:

first storage mans coupled to said data memory for supplying said write or read address information to said data memory;

second storage means for temporarily storing first address information;

third storage means for temporarily storing second address information;

control means coupled to said third storage means for producing constant information irrespective of said second address information in said data write operation and for producing third address information relative to said second address information in said data read operation; and arithmetic means, coupled to said first and second storage means and said control means, for producing fourth address information relative to said first address information in response to said first address information and said constant information and for writing said fourth address information into said first storage means as said write address information, said arithmetic means producing fifth address information corresponding to a difference between said first and second address information in response to said first and third address information and for writing said fifth address information into said first storage means as said read address information.

3. The circuit as claimed in claim 2, wherein said arithmetic means includes means for producing said fourth address information by adding said first address information and said constant information and means for producing said fifth address information by subtracting said third address information from said first address information.

4. An address control circuit for a data memory, comprising:

first register means coupled to said data memory;

second register means for temporarily storing write address information;

third register means for temporarily storing offset address information;

an adder circuit having a first input node coupled to said second register means to receive said write address information, a second input node and an output node coupled to said first register means, said adder circuit performing an adding operation on information supplied to said first and second input nodes thereof;

control means coupled between said third register means and said second input node of said adder circuit for supplying constant information to said second input node of said adder circuit in a data write operation irrespective of said offset address information and for supplying control information relative to said offset address information from said third register means to said second input node of said adder circuit in a data read operation; and storing means coupled between said output node of said adder circuit and said second register means for storing output address information from said adder circuit into said second register means in said data write operation.

5. The circuit as claimed in claim 4, wherein said third register means includes a plurality of registers, each of said plurality of registers temporarily storing offset address information and means responsive to selection data for selecting one register of said registers to supply said offset address information stored in said one register to said control means.

6. The circuit as claimed in claim 4, wherein said constant information is zero and said control means includes means for inverting said offset address information from said third register means to produce said control information, said adder circuit adding said information supplied to said first and second input nodes to produce added information and further incrementing said added information by one.

7. An address control circuit for supplying a data memory with write address information in a data write operation and with read address information in a data red operation, comprising:

first storage means coupled to said data memory for supplying said write or read address information to said data memory;

second storage means for temporarily storing first address information;

third storage means for temporarily storing second address information; and arithmetic means coupled to said first, second and third storage means for writing third address information relative to said first address information into said first storage means and for renewing said first address information of said second storage means in said data write operation, said arithmetic means producing fourth address information corresponding to a difference between said first address information of said second storage means and said second address information of said third storage means and writing said fourth address information into said first storage means in said data read operation, said arithmetic means including means for incrementing said first address information by a predetermined value to produce said third address information and means for subtracting said second address information from said first address information of said second storage means to produce said fourth address information, said subtracting means including means of inverting said second address information to produce inverted address information, means for adding said inverted address information and said first address information of said second storage means to produce added address information and means for incrementing said added address information by one.

* * * * *